US008910509B2

(12) United States Patent
Terentiev et al.

(10) Patent No.: US 8,910,509 B2
(45) Date of Patent: Dec. 16, 2014

(54) APPARATUS AND METHOD FOR THE INTEGRITY TESTING OF FLEXIBLE CONTAINERS

(75) Inventors: Alexandre N. Terentiev, Lexington, KY (US); Sergey Terentiev, Chaska, MN (US)

(73) Assignee: Pall Technology UK Limited, Portsmouth (GB)

( * ) Notice: Subject to any disclaimer, the term of this patent is extended or adjusted under 35 U.S.C. 154(b) by 1059 days.

(21) Appl. No.: 12/894,222

(22) Filed: Sep. 30, 2010

(65) Prior Publication Data

US 2011/0011164 A1     Jan. 20, 2011

Related U.S. Application Data

(63) Continuation of application No. PCT/US2009/038338, filed on Mar. 26, 2009.

(60) Provisional application No. 61/040,971, filed on Mar. 31, 2008.

(51) Int. Cl.
  *G01M 3/04* (2006.01)
  *G01M 3/22* (2006.01)
(52) U.S. Cl.
  CPC .................................... *G01M 3/227* (2013.01)
  USPC ............................................... 73/49.3; 73/40
(58) Field of Classification Search
  USPC .............................................. 73/49, 49.3, 40
  See application file for complete search history.

(56) References Cited

U.S. PATENT DOCUMENTS

| | | | |
|---|---|---|---|
| 3,762,212 A * | 10/1973 | Morley et al. .................. 73/40.7 |
| 4,588,085 A | 5/1986 | Sussman | |
| 5,111,684 A * | 5/1992 | Stauffer et al. ................ 73/49.3 |
| 5,287,729 A * | 2/1994 | Lehmann ...................... 73/49.3 |
| 5,513,516 A * | 5/1996 | Stauffer ........................ 73/49.2 |
| 5,728,929 A | 3/1998 | Gevaud | |

(Continued)

FOREIGN PATENT DOCUMENTS

DE    3340353 A1    5/1985
EP    1616938 A2    1/2006

(Continued)

OTHER PUBLICATIONS

Standard Test Method for Pressure Decay Leak Test for Flexible Packages With and Without Restraining Plates Copyright © ASTM International 100 Barr Harbor Drive, PO Box C700, West Conshohocken, PA 19428-2959, United States Designation: F2095-07 ∈1.

(Continued)

*Primary Examiner* — Hezron E Williams
*Assistant Examiner* — Rodney T Frank
(74) *Attorney, Agent, or Firm* — King & Schickli, PLLC

(57) ABSTRACT

An apparatus for integrity testing a first container having a flexible body at least partially defining a first interior chamber using a second container having a second, preferably sterilized interior chamber at least partially filled with a detectable gas. A sensor associated with a detection chamber for receiving the flexible container, and possibly the second container as well, senses the presence of the detectable gas external to the first interior chamber in the event of a leak of the detectable gas therefrom. Related methods also involve integrity testing of fluid processing bags and other types of flexible containers.

38 Claims, 10 Drawing Sheets

(56) References Cited

U.S. PATENT DOCUMENTS

| | | | |
|---|---|---|---|
| 5,907,093 | A | 5/1999 | Lehmann |
| 6,305,215 | B2 | 10/2001 | Lehmann |
| 6,460,405 | B1 | 10/2002 | Mayer et al. |
| 7,308,819 | B2 | 12/2007 | Kamio et al. |
| 7,313,944 | B2 | 1/2008 | Lehmann |
| 2004/0081601 | A1 | 4/2004 | Morrissey et al. |
| 2005/0247110 | A1 | 11/2005 | Sagi et al. |
| 2006/0277975 | A1 | 12/2006 | Barcan |
| 2010/0326172 | A1 | 12/2010 | Voute et al. |

FOREIGN PATENT DOCUMENTS

| | | | |
|---|---|---|---|
| JP | 6011408 | A | 1/1994 |
| JP | 08-082568 | | 3/1996 |
| WO | WO 91/16611 | | 10/1991 |
| WO | 94/05991 | | 3/1994 |
| WO | 98/54560 | | 12/1998 |
| WO | 2009/145991 | A1 | 12/2009 |

OTHER PUBLICATIONS

Seal Strength and Package Integrity—The Basics of Medical Package Testing Stephen Franks @ TM Electronics, Inc. 10 Pages.

ASTM International—Designation: F2391-05 ASTM F2391-05(2011) Standard Test Method for Measuring Package and Seal Integrity Using Helium as the Tracer Gas Current edition approved Apr. 1, 2005. Published May 2005 Copyright © ASTM International, 100 Barr Harbor Drive, PO Box C700, West Conshohocken, PA, 19428-2959 USA.

Miyako, Yasuhiro et al, Helium Leak Test for Sterility Assurance of a Sealed Bag. I: Relationship of Helium Leak and Pinhole Diameter, PDA Journal of Pharmaceutical Science and Technology, Jul./Aug. 2002, pp. 183-191, vol. 56, No. 4, Osaka, Japan.

Miyako, Yasuhiro et al, Helium Leak Test for Sterility Assurance of a Sealed Bag. II: Establishing a Test Method for the Manufacturing Process, PDA Journal of Pharmaceutical Science and Technology, May/Jun. 2003, pp. 186-197, vol. 57, No. 3, Osaka, Japan.

Package-Port System (Mar. 12, 2006) TMElectronics, Inc. Specialists in Leak, Flow and Package Testing Package-Port © System XP055128915 https://web.archive.org/web/20060312033608/http://www.tmelectronics.com/TME_Package-Port_System.pdf.

Strength and Integrity—The Basics of Medical Package Testing Chapter 1: An Overview XP055128923—Strength and Integrity—The Basics of Medical Package Testing Chapter 1: An Overview http://www.tmelectronics.com/userfiles/files/The Basics of Med Pkg Testing Article 3 chapters.pdf (Jan. 1, 2001).

* cited by examiner

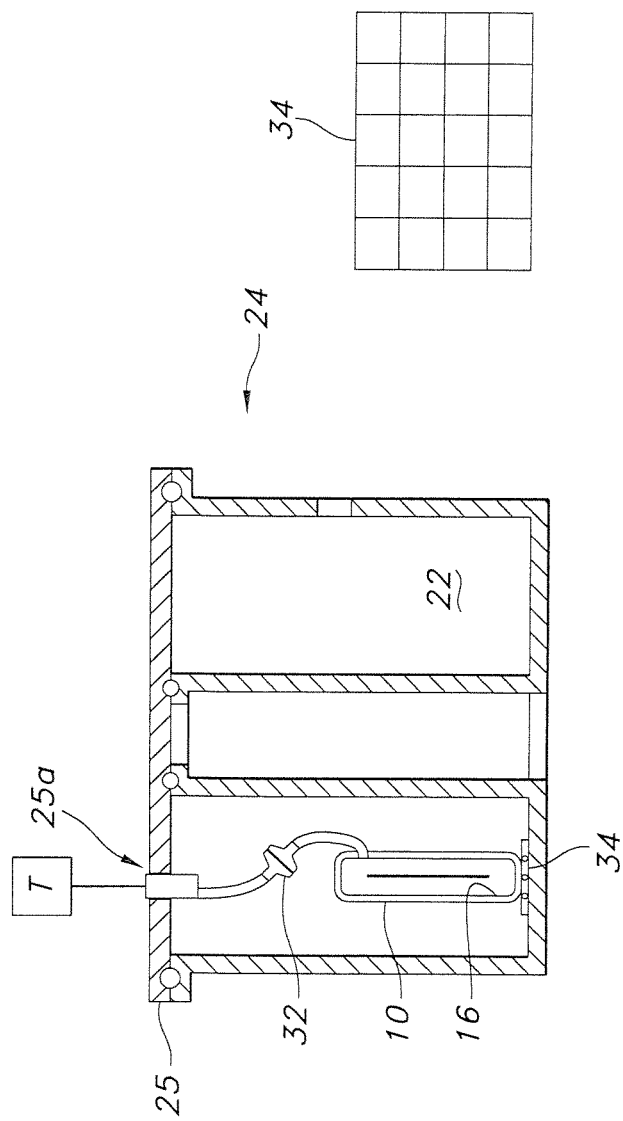

APPARATUS AND METHOD FOR THE INTEGRITY TESTING OF FLEXIBLE CONTAINERS

This application claims the benefit of U.S. Provisional Patent Application Ser. No. 61/040,971, filed Mar. 31, 2008, the disclosure of which is expressly incorporated herein by reference. This application is a continuation of international application PCT/US09/38338, the disclosure of which is incorporated herein by reference.

TECHNICAL FIELD

The present invention relates generally to integrity testing, and, more specifically, to testing the integrity of flexible containers, such as fluid processing bags.

BACKGROUND OF THE INVENTION

Hermetically closed, flexible containers such as plastic bags or liners are frequently used in many applications. For example, in the course of bioprocessing, such bags are often used for bulk intermediate storage, cell culture re-suspension, viral inactivation, final formulation, final fill, or as bioreactors. In many such applications and others, the bag is pre-sterilized, and such condition must be maintained in order to avoid contamination of the product resulting from use of the bag. In the case of bioprocessing, any breach of the sterile condition is considered to be a serious deviation from the conventional protocol, and often results in the discarding of the batch of valuable product, sometimes after significant cost and effort has been expended in the course of making it.

Most bags, including those of the type commonly used for bioprocessing, comprise one or more relatively thin layers of plastic film and thus are prone to damage during shipping and handling. Moreover, the bags often comprise individual sheets or panels of film welded together (such as by heating or ultrasonic means), which can contribute to defects and concomitant leaks along the corresponding seals thus formed. For these reasons, it is highly desirable and perhaps even necessary to validate the integrity of the supposedly sterile bag before valuable product is introduced into it. Likewise, it is also often desirable to check the integrity of the bag after use in order to insure that the integrity of the bag was maintained during the entire period of use (which in the case of bioprocessing can be a relatively long time, such as a few weeks).

Thus, a need is identified for a manner of testing the integrity of a flexible container, such as a bag. The integrity test should be easy to implement (e.g., not bulky or cumbersome), relatively inexpensive, reliable, and should be done in a manner that does not contaminate the interior compartment of the container undergoing testing.

SUMMARY OF THE INVENTION

An apparatus for integrity testing is disclosed. The apparatus in one form includes a first container, preferably but not necessarily comprising a fluid processing bag having a sterile first interior chamber (which may optionally include a fluid-agitating element). A second container having a second interior chamber (such as a bag, tube, tank or the like) including a detectable gas is adapted for selective fluid communication with the first interior chamber to deliver the gas under sterile conditions. Delivery of the detectable gas from the second interior chamber to the first interior chamber allows for any leak therefrom to be sensed, such as by a leak sensor.

In one embodiment, the apparatus includes a valve for controlling a flow of the detectable gas to the first interior chamber. This valve may associate with a conduit connecting the first interior chamber to the second container (which may include a sterilized second interior chamber). Preferably, the conduit includes a connector (such as a sterile connector or sterilizing filter) for delivering the detectable gas under sterile conditions.

In this or another embodiment, a third container is provided having a third chamber for receiving at least the fluid processing bag. In one arrangement of the apparatus, the second container is external to the third chamber, but the second container may also be positioned in the third chamber. Preferably, the third container is rigid and hermetically sealed, and has a vacuum applied thereto to enhance the flow of any leak present in the first container.

In a further embodiment, an apparatus is provided for use in detecting a leak of a detectable gas in a hermetically sealed detection chamber. The apparatus comprises a sterilized first container for positioning in the detection chamber. The first container includes a flexible body at least partially defining a first interior chamber for receiving the detectable gas. A sensor associated with the detection chamber is capable of sensing the detectable gas external to the first interior chamber as the result of the leak. A pump or like means may be provided for creating a pressure differential between the first interior chamber and the detection chamber. A spacer may also be included for promoting the escape of the detectable gas from a leak in the first container (such as by spacing the leak from a fold of the flexible container or a sidewall of the detection chamber).

In one particular embodiment of this apparatus, a valve is provided for controlling the flow of the detectable gas from a source of the detectable gas to the first interior chamber. The apparatus may further include a sterile connector for delivering the detectable gas to the first interior chamber under sterile conditions.

In this embodiment or other embodiments, a rigid container defines the detection chamber for receiving the first container. Preferably, the rigid container includes a port adapted for delivering the detectable gas from a source external to the first interior chamber. The rigid container may further include a cover for hermetically sealing the detection chamber, and the cover may include a port adapted for permitting the delivery of the detectable gas from a source external to the detection chamber. The means for creating a pressure differential may comprise means for applying a vacuum to the chamber (such as, for example, a pump or blower).

In another aspect, the disclosure relates to a method of integrity testing a first container including a flexible body defining an interior compartment using a source of a detectable gas and positioned in a hermetically sealed chamber. The method comprises: (1) delivering the detectable gas to the interior compartment of the container; (2) creating a pressure differential between the interior compartment of the first container and a space external to the interior compartment in the hermetically sealed chamber; and (3) sensing whether the detectable gas is present in the hermetically sealed chamber.

The method may further include the step of sterilizing the first container before the delivering step. Preferably, the delivering step comprises attaching the first container to a second container including the detectable gas under sterile conditions. Also, the detecting step may comprise placing the flexible container and the second container in the hermetically sealed chamber, or alternatively placing only the flexible container in this chamber.

A further aspect is a method for use in integrity testing a sterilized fluid processing bag having an interior compartment. The method comprises attaching a container at least partially filled with a detectable gas to the fluid processing bag. The method further comprises delivering detectable gas from the second container to the interior compartment of the fluid processing bag under sterile conditions. A further step of determining the presence of a leak of the detectable gas from the first interior compartment is also performed.

The method preferably further comprises the step of sterilizing the fluid processing bag and container while attached together. The method may also further include the step of positioning the fluid processing bag in a detection chamber prior to the attaching step. Preferably, the delivering step comprises delivering the detectable gas through a sterile filter.

BRIEF DESCRIPTION OF THE DRAWINGS

FIG. 9 illustrates a possible manner of using the embodiment of FIGS. 8a-8c;

FIG. 9a illustrates one possible embodiment of a spacer for use in the integrity testing system.

DETAILED DESCRIPTION OF THE INVENTION

FIGS. 1-4 schematically illustrate embodiments of an apparatus for use in connection with testing the integrity of a container having a flexible body defining an interior compartment. An example of such a container is a fluid processing bag 10, as shown schematically in FIG. 1 (but see also the photographs of FIGS. 10 and 11). As used herein, "flexible" describes the condition in which a relatively thin wall of the container body is capable of changing shape upon the introduction of a volume of fluid to the interior compartment, as opposed to a rigid body that maintains it shape and contains a defined volume regardless of the presence of fluid in the interior compartment of the container.

Figure 1:
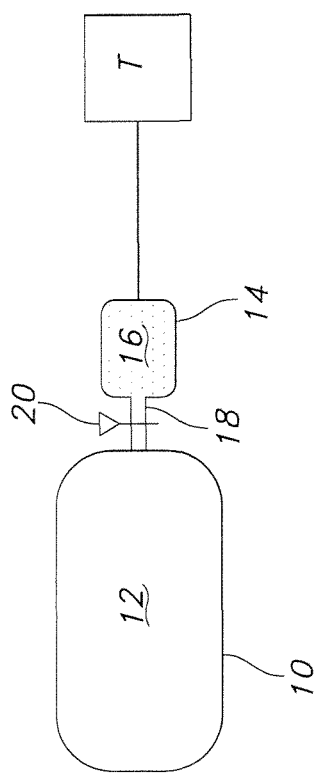
FIG. 1 schematically illustrates a first embodiment of an apparatus for use in connection with testing the integrity of a flexible container.
Figure 2:
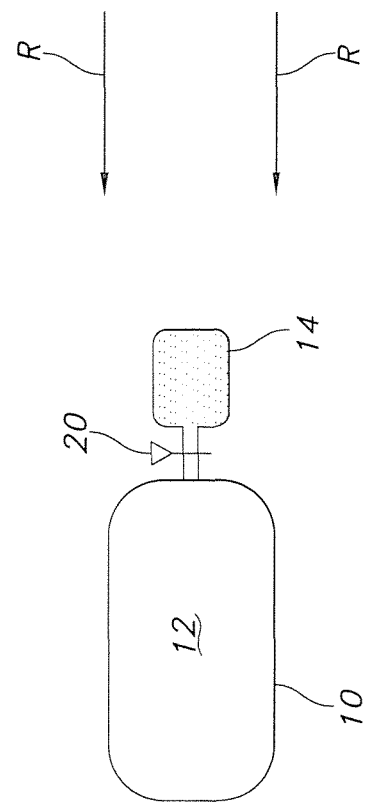
FIG. 2 is a further schematic illustration of the FIG. 1 apparatus.
Figure 3:
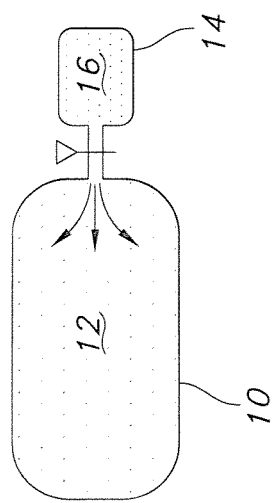
FIG. 3 illustrates a potential manner of delivering a trace gas to the flexible container in need of integrity testing.
Figure 4:
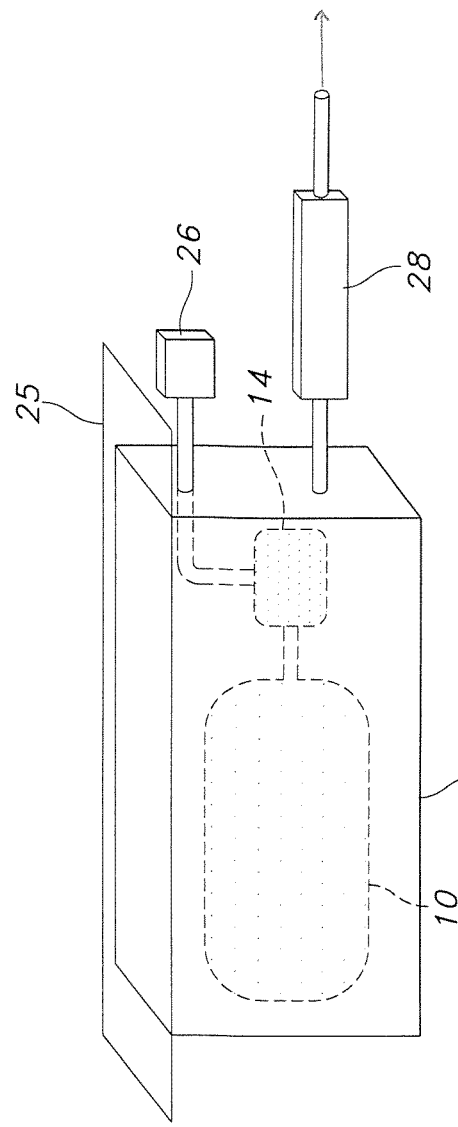
FIG. 4 schematically illustrates a second embodiment of an apparatus us for use in connection with integrity testing of a flexible container.
Figure 5:
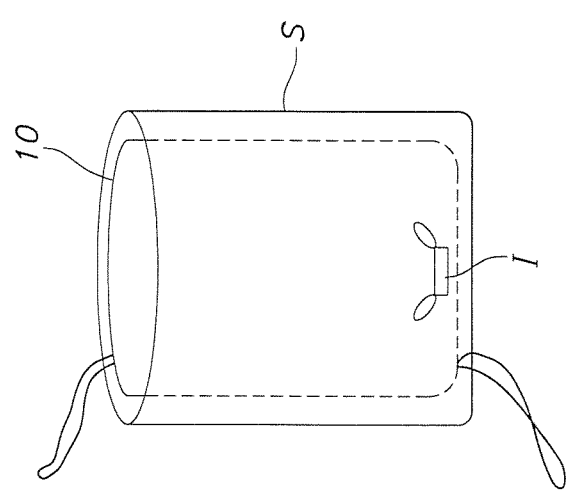
FIG. 5 illustrates one possible end use of the flexible container for mixing a fluid under sterile conditions.

In using the bag 10 for its intended purpose, a first interior chamber 12 may receive, hold, or store an intermediate product, such as a fluid undergoing processing. Such processing may comprise, for example, positioning the bag 10 in a rigid support structure S and then performing mixing using an impeller I rotated by way of a non-contact (e.g., magnetic) coupling with an external motive device (see FIG. 5). In the case of bioprocessing, the mixing or processing is usually done under sterile conditions.

In a preferred embodiment, the bag 10 is fabricated of one or more relatively thin layers of flexible plastic film, such as polyethylene or like materials, and in the absence of a leak is fluid-impervious. The bag 10 may include conventional sealed ports or like openings for interfacing with external structures, or for receiving or releasing fluids, sensors, powders, or the like. Despite the foregoing description of a preferred environment, the particular end use or type of bag 10 employed is not considered to limit in any way the application of the inventive principles described herein.

In using the integrity testing apparatus, the interior compartment of the bag 10 may first be provided with a detectable gas, such as from an external source. In one possible embodiment, as shown in FIGS. 1-4, 7 and 9, this source comprises a second container, such as a bag 14 (FIGS. 1-4 only) having a second interior chamber 16 for containing the detectable gas. This chamber 16 may be directly connected to the first chamber 12, such as by a conduit 18. While the containers may be similar, the volume of the second container, such as bag 14, is preferably less than the volume of the first container or bag 10 and, most preferably, greater than at least 10% less. As illustrated, the two bags 10, 14, may be connected in a side-by-side, tandem or non-nested fashion, such that neither is internal to the other.

Although preferably in the form of the bag 14 shown in the figures, the second container may take other forms. For example, instead of a bag 14, this container may be any type of rigid or flexible vessel, including a piece of tube sealed at the distal end and connected to the first container 10 at the opposite end, such as by using a conventional barbed port (not shown) or other type of connector adapted to form a secure, sterile connection. Regardless of form, this second container may be made of plastic or metal, and in the case of a bag 14 most preferably comprises a layer of metalized film to help prevent diffusion from the second interior compartment 16.

An associated valve 20 may selectively control the fluid communication between the first and second chambers 12, 16. In one particularly simple form, the valve 20 comprises a pinch clamp for closing off the flow path (such as established by conduit 18) otherwise placing the chambers 12, 16 in fluid communication. Advantageously, the use of such a simple and selective means for controlling flow between the chambers 12, 16 allows for the apparatus including bags 10, 14 to be manufactured inexpensively and in a readily disposable fashion. Consequently, it can simply be discarded after use in the intended manner. However, the use of other conventional types of flow control valves, including for example a standard ball valve, is also possible.

In one possible mode of using the apparatus, the chamber 16 is at least partially filled with a detectable gas using a source of the gas, such as a pressurized tank T (which in other embodiments may comprise the second container). For reasons better understood upon reviewing the following description, the detectable gas preferably comprises a "trace" gas in terms of its concentration in the ambient air (generally, a gas that makes up less than 1% by volume of the earth's atmosphere). Most preferred trace gases include helium, hydrogen, argon, and mixtures thereof, but other biologically neutral gases that can be readily detected at relatively small concentrations in air can be used.

The second container, such as bag 14, may be made available at least partially pre-filled with trace gas with or without having been pre-sterilized. In the event that the second container and trace gas are not pre-sterilized, they can be subsequently sterilized after connection to the first container, such as bag 10. Furthermore, the second container can also be filled with trace gas after connection to the first container or bag 10.

In the one example of such a "pre-filled" embodiment, the corresponding second container (e.g., bag 14) filled with the detectable or trace gas is attached to the bag 10, such as by associating the conduit 18 with a port (not shown). While preferably done at the manufacturing facility, it is also possible for the second container filled with the detectable gas to be attached to the bag 10 at a different location. For example, the attachment may occur at the facility of the end user. In the situation where the bag 10 is pre-sterilized, the attachment or connector used may include well known types of sterile delivery means, such as sterile connectors (e.g., the KLEENPAK connector of the Pall Corporation, or the LINX connector of the Millipore Corporation), or sterilizing filters, to maintain the desired sterility before and during the integrity test.

In any case, the valve 20 if present is initially arranged such that fluid communication is not established between the second chamber 16 to the first chamber 12 (in other words, the first and second chambers 12, 16 are not yet selected to be in fluid communication). The entire assembly including the bag 10 (which preferably is substantially evacuated), the bag 14 or other container with the detectable gas, conduit 18, and valve 20, may then be sterilized. Preferably, sterilization is achieved through a non-invasive means, such as for example gamma irradiation (note action arrows R), steam (provided, of course, the materials used can withstand such treatment), autoclaving, or like techniques. In any case, such procedure preferably results in both chambers 12, 16 and their contents being sterilized.

Typically, an operator involved with the disclosed integrity testing apparatus and methods receives the pre-sterilized bag 10 prior to usage, such as for example once it arrives at a location where bioprocessing is to occur. Prior to use, the operator may open any valve 20 or valves obstructing flow between the second chamber 16 and the first chamber 12. This establishes a flow path and allows the detectable gas as a fluid to communicate from the second chamber 16 to at least partially fill the first chamber 12, but without altering the sterile condition of the bag 10 (unless of course there is a leak to be identified). Preferably, the flow is in an amount sufficient to at least partially pressurize and expand the bag 10, but most preferably is minimized to reduce the associated expense in terms of the volume of gas used.

At least the bag 10, and possibly the second container (bag 14) as well, may then be placed inside a third chamber 22, such as one formed by a rigid container 24. This "detection" chamber 22 is arranged such that it can be hermetically sealed to separate it from the ambient atmosphere once at least the bag 10 is positioned therein. For example, the container 24 may include a removable cover 25 adapted for forming such a sealed environment, preferably in a temporary fashion to allow ready access to the detection chamber 22.

A sensor 26 for sensing the trace gas is associated with the chamber 22 to detect the presence of the detectable gas external to the bag 10. The sensor 26 may comprise, for example, a highly sensitive mass-spectrometer type of trace gas detector capable of detecting minute concentrations of the selected gas or gases, either by projecting into this chamber or being in fluid communication with the chamber (such as by a conduit extending to a remote location). In the case of the leak in the bag 10 impacting sterility (such as, for example, a hole having a dimension of 30 micron, but possibly as small as 1 micron), the trace gas may readily penetrate into this chamber 22. The presence of this gas may be detected by the sensor 26, thus indicating a leak, and the likelihood that any sterile condition has not been maintained in the first interior compartment of the first container, such as bag 10.

Means for creating a pressure differential between the interior chamber of the bag 10 and the external spaced defined by the detection chamber 22 may also be provided. For example, this means may comprise means for applying a vacuum to the third chamber 22, such as by using a suitable blower or pump 28. The associated pressure differential created between the interior of the bag 10 and the surrounding space in the detection chamber 22 forces the gas to escape faster from any hole in the bag, thus enhancing the early detection of the leak by the sensor 26. In some situations, this may further help to differentiate the presence of the gas external to the bag 10 as the result of mere diffusion.

The techniques described may be used to test the integrity of the bag 10, such as after it is used in the course of bioprocessing. In such case, the bag 10 would be at least partially filled with the trace gas, such as from the second chamber of an associated second container, such as the illustrated bag 14. The bag 10 including the gas is then placed in the hermetically sealed third chamber 22 and the sensor 26 used to detect any leak present.

Figure 6A:
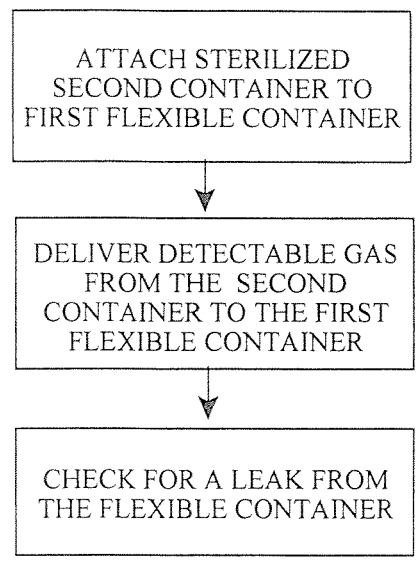
FIGS. 6a-6c present flow charts illustrating various manners for conducting the integrity testing.
Figure 6B:
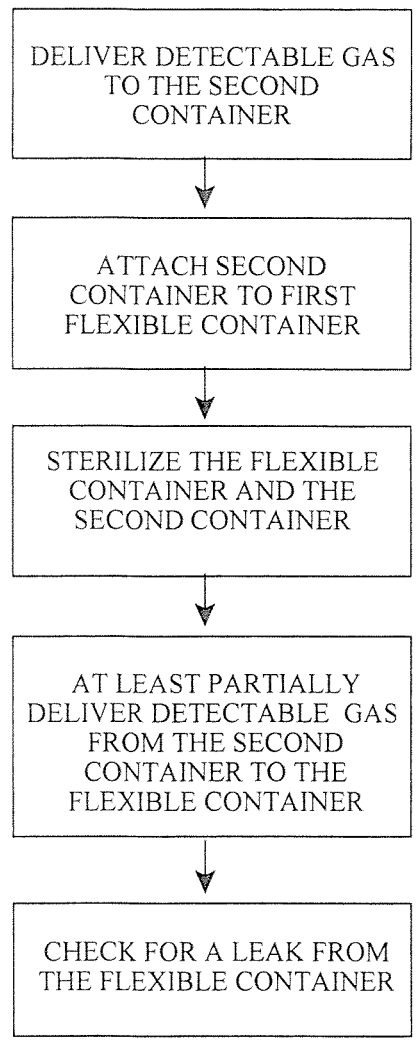
Figure 6C:
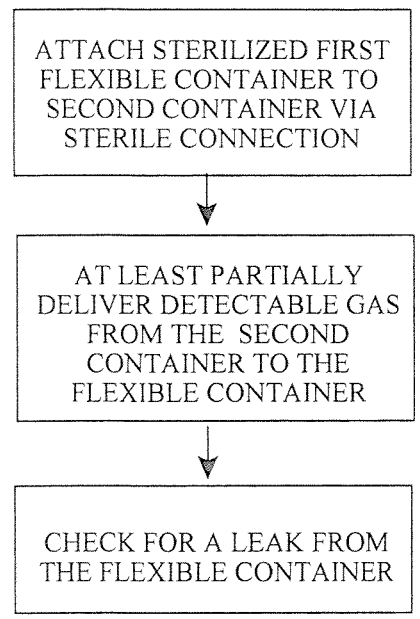

As noted above and indicated in the flow chart of FIG. 6a, the bag 14 serving as the second container may be pre-sterilized with the detectable gas and then attached to the bag 10 serving as the flexible container prior to use. However, as shown in FIG. 6b, the second container or bag 14 including the detectable gas may be attached to the bag 10 and then the two sterilized together. Furthermore, as shown in FIG. 6c, the bag 10 may be pre-sterilized with a sterile connector or filter and then later connected to a source of the trace gas (which may not be sterile), prior to checking for leaks.

Figure 7:
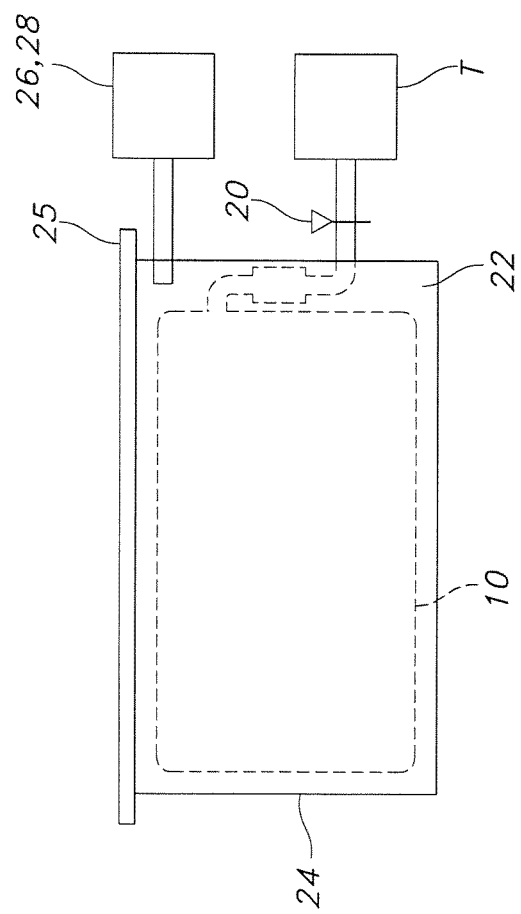
FIG. 7 schematically illustrates a third embodiment of an apparatus for use in connection with testing the integrity of a flexible container.

In another embodiment, as shown in FIG. 7, the arrangement is such that the flexible container such as bag 10 is pre-sterilized and placed in the third chamber 22 defined by a hermetically sealed rigid container 24 (note cover 25). This chamber 22 may be in fluid communication with both the sensor 26 and a pump 28 (e.g., a blower) for creating the pressure differential as a combined device (such as, for example, a VARIAN MD30 VS leak detector), including possibly through the same port in the rigid container 24 using suitable tubing or the like. Unlike in the previously described embodiments, the second container including the trace gas (which could be a bag 14, a tank T, or the like) is provided external to this third chamber 22, but in fluid communication with the pre-sterilized bag 10. Preferably, the fluid communication is selective by way of valve 20, and also by way of a sterile connection including a filter, such that the sterility of the bag 10 is maintained in the absence of a leak.

With the bag 10 positioned in the container, a pressure differential is created in the third chamber 22, such as by creating a vacuum (e.g., 10-20% of atmospheric pressure) using the pump 28. The detectable gas from the source may be permitted to flow in a limited amount into the bag 10 through the sterile connection (such as by opening an associated valve 20). As should be appreciated, the detectable gas from any significant leak in the bag 10 may thus be detected by the sensor in fluid communication with the third chamber 22. Indeed, it is preferable to first place a vacuum on the third chamber 22 before introducing the detectable gas to the bag 10, since this will more readily expose any leak.

Figure 8A:
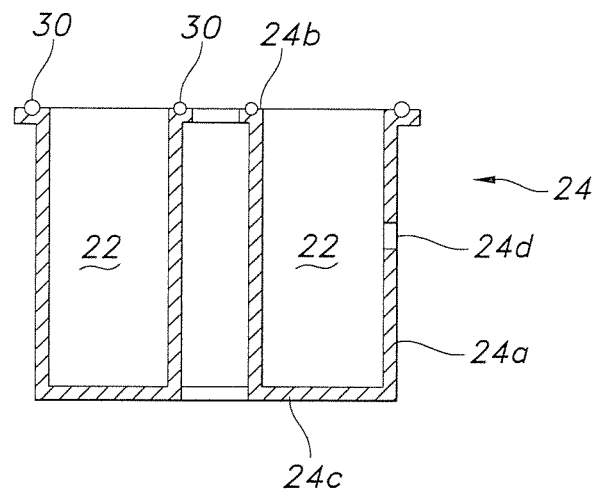
FIGS. 8a-8c illustrate a fourth embodiment of an apparatus for use in connection with testing the integrity of a flexible container.
Figure 8B:
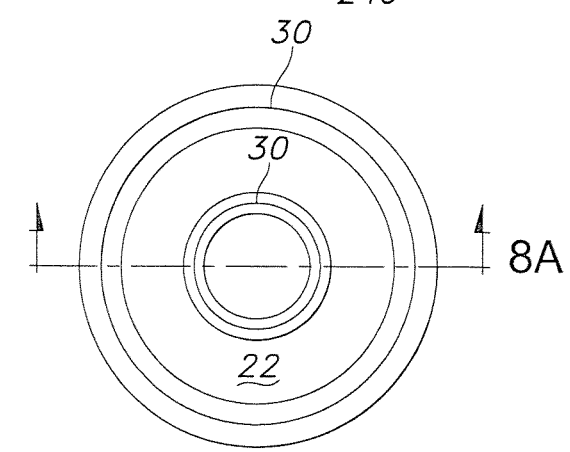
Figure 8C:
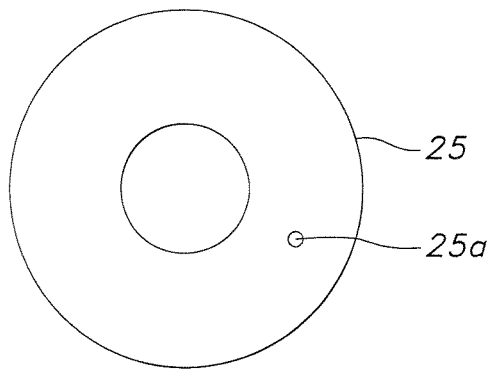

A most preferred embodiment of the third container 24 is shown in FIGS. 8a-8c. In this embodiment, the container 24 comprises two generally cylindrical, generally concentric upstanding walls 24a, 24b that together define an open annular space therebetween. This space forms the chamber 22 (which is annular) for receiving the flexible container, such as bag 10, in need of integrity testing. A floor 24c is provided at the lower end of the container 24, while the upper end is open for receiving the flexible container or bag 10 in need of testing. Upper portions of the walls 24a, 24b may be adapted for receiving or supporting one or more sealing elements 30, such as gaskets, O-rings, or like structures, to form a substantially airtight (i.e., hermetic) seal with the cover 25. In this embodiment, and as shown in FIG. 8c, the cover 25 preferably comprises a generally annular, transparent piece of plastic material capable of withstanding any pressure applied to the chamber 22 during testing of the first container or bag 10.

In the embodiment described above, a port 24d may be provided in the side of the third container 24 for creating the pressure differential in the chamber 22 during the testing of the included flexible container, such as bag 10, for leaks of the detectable gas. As shown in FIG. 9, a port 25a may also be provided, such as through the cover 25, for receiving a connection to the external source (e.g., tank T or bag 14) of the detectable gas with the bag 10 inside the third chamber 22. Suitable permanent tubing and connectors may also be provided for connecting with a sterilizing filter 32 associated with the bag 10 in the chamber 22, and with the external source T of the detectable gas external to this chamber.

As shown in FIGS. 9 and 9a, it may further be desirable to use a spacer 34 in connection with bag 10 to enhance performance by preventing any leak from being temporarily blocked. Specifically, the spacer 34 may be arranged between an outer surface of the bag 10 and an inner surface of the third container 24 forming the chamber 22, or between any folds in the bag, or both. Preferably, the spacer 34 comprises a generally open structure, such as a mesh, screen, rack, or other reticulated or latticework body and, most preferably, one having sufficient porosity to avoid blocking any leak (including by way of a coating), or a combination of the two (e.g., a rack having a porous coating). In any case, the spacing function afforded by spacer 34, combined with the ability of the detectable gas to pass without obstruction, helps to prevent any leak in the bag 10 from being inadvertently blocked, by contact with the sidewalls of the container 24, the folds of the bag, or both. In the case of a relatively large, foldable bioprocessing bag having a plurality of outwardly projecting flaps or like extensions, the spacer 34 may include corresponding peak(s) and trough(s) (such as by creating a V or W-shaped structure) to accommodate these flaps individually and providing the desired spacing to prevent any leak in an adjacent surface from being obstructed.

Figure 10:
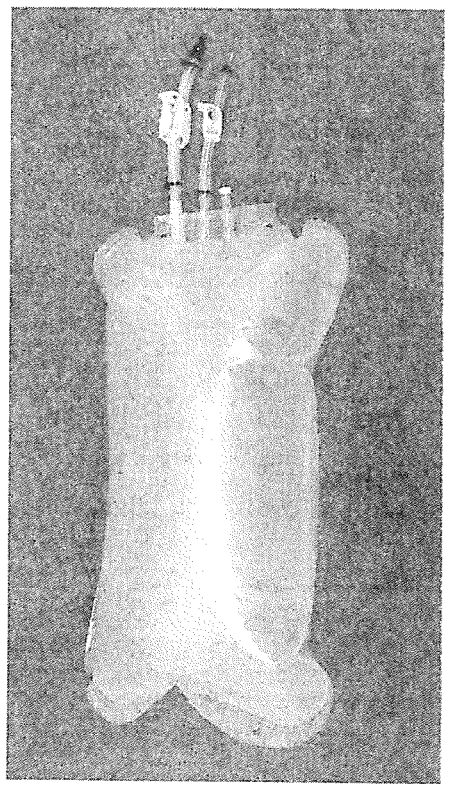
FIGS. 10 and 11 are before and after pictures of an experiment conducted involving a flexible container including a detectable gas.

An experiment estimated the diffusion rate through the film of a conventional bioprocessing bag. The bag selected for the experiment was a 20 liter pillow-shaped bag having a total area of film estimated at 0.37 square meters. After the bag was substantially evacuated, pressurized helium gas was supplied to the interior compartment of the bag, such that it was inflated as shown in FIG. 10.

Figure 11:
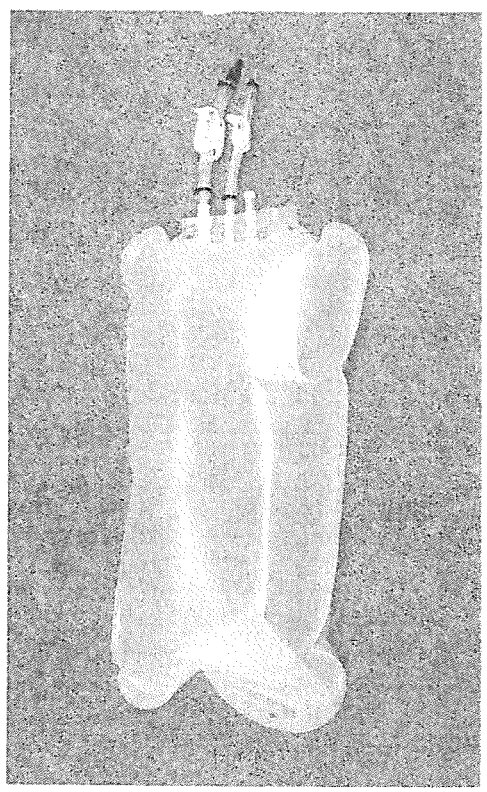

After approximately 47 days, this particular bag was observed as having partially deflated, as shown in FIG. 11. In order to measure the volume of helium gas that escaped, the bag was submersed in water and the volume difference measured. As a result, the total amount of helium that escaped that bag was estimated to be 854 cubic centimeters, or 42 cubic centimeters per day (5 times $10^{-4}$ cubic centimeters-atm/second).

Extrapolating this to a 500 liter bag having similar characteristics to the bag used during the experiment (which may not be reflective of the diffusion characteristics of other available bags, but is simply cited as an example), having a surface area of 2.5 square meters, an approximate ten fold increase would result. Assuming a proportional rate of escape, then the gas lost through diffusion with such a bag would be $5 \times 10^{-3}$ cubic centimeters-atm/second.

The leak produced by a ten micron hole in a bag is estimated to be 10 cubic centimeters-atm/second. For reliable leak detection, the escape of gas through the hole should be about ten times greater than the diffusion rate. Thus, for a 500 liter bag having characteristics similar to the bag used during the experiment, the minimum detectable leak rate would be approximately 5 times $10^{-2}$ cubic centimeters-atm/second, which corresponds to a hole size of about fifteen micron. Assuming conservatively that the pressure drop in the bag during testing would be about ten percent of atmospheric pressure, the estimated minimum detectable hole in a 500 liter bag would be approximately thirty micron, which is less than half the width of an average human hair.

The foregoing descriptions of various embodiments of the present inventions have been presented for purposes of illustration and description. These descriptions are not intended to be exhaustive or to limit the invention to the precise forms disclosed. It will be understood by a skilled artisan that, over time, the detectable gas may diffuse through certain types of film, usually in especially small concentrations. Hence, the technique disclosed herein may limit the minimum size of the leak that can be detected to exclude this diffusion. It is believed that with routine experimentation, this type of gas diffusion through the film can be readily distinguished from the amount of gas that would more readily flow as the result of a leak potentially impacting the sterility of the first container. The embodiments described provide the best illustration of the principles of the invention and its practical applications to thereby enable one of ordinary skill in the art to utilize the invention in various embodiments and with various modifications as are suited to the particular use contemplated.

The invention claimed is:

1. An apparatus for use in detecting a detectable gas in a hermetically sealed detection chamber, comprising:
   a sterilized first container for positioning in the detection chamber, said first container having a flexible body at least partially defining a first interior chamber for receiving and holding the detectable gas in the absence of a leak;
   a sensor associated with the detection chamber and capable of sensing the detectable gas external to the first interior chamber as the result of the leak;
   a pump for creating a pressure differential between the first interior chamber and the detection chamber; and
   a connector for delivering the detectable gas to the first interior chamber under sterile conditions.

2. The apparatus of claim 1, further including a valve for controlling the flow of the detectable gas from a source of the detectable gas to the first interior chamber.

3. The apparatus of claim 1, wherein the connector comprises a sterilizing filter.

4. The apparatus of claim 1, further including a rigid container forming the detection chamber for receiving the first container.

5. The apparatus of claim 4, wherein the rigid container includes a port adapted for delivering the detectable gas from a source external to the first interior chamber.

6. The apparatus of claim 4, wherein the rigid container further includes a cover for hermetically sealing the detection chamber.

7. The apparatus of claim 6, wherein the cover includes a port adapted for permitting the delivery of the detectable gas from a source external to the detection chamber.

8. The apparatus of claim 6, wherein the first container comprises a fluid processing bag including a fluid-agitating element.

9. The apparatus of claim 6, further including a spacer for promoting the escape of the detectable gas from any leak in the first container.

10. An apparatus for use in detecting a detectable gas in a detection chamber, comprising:
- a sterilized first container for positioning in the detection chamber, said first container having a flexible body at least partially defining a first interior chamber for receiving and holding the detectable gas under sterile conditions;
- a conduit connected to the sterilized first container for delivering the detectable gas to the interior compartment;
- a sensor associated with the detection chamber and capable of sensing the detectable gas external to the first interior chamber as the result of the leak; and
- a pump for creating a pressure differential between the first interior chamber and the detection chamber.

11. The apparatus of claim 10, further including a valve associated with the conduit for controlling the flow of the detectable gas from a source of the detectable gas to the first interior chamber.

12. The apparatus of claim 10, wherein the conduit comprises a sterilizing filter.

13. The apparatus of claim 10, further including a rigid container forming the detection chamber for receiving the first container.

14. The apparatus of claim 13, wherein the rigid container includes a port adapted for delivering the detectable gas from a source external to the first interior chamber.

15. The apparatus of claim 14, wherein the conduit passes through the port of the rigid container.

16. The apparatus of claim 14, wherein the rigid container further includes a cover for hermetically sealing the detection chamber.

17. The apparatus of claim 16, wherein the cover includes a port adapted for permitting the delivery of the detectable gas from a source external to the detection chamber.

18. The apparatus of claim 16, wherein the first container comprises a fluid processing bag including a fluid-agitating element.

19. The apparatus of claim 10, further including a spacer for promoting the escape of the detectable gas from any leak in the first container.

20. An apparatus for use in detecting a detectable gas in a detection chamber, comprising:
- a sterilized fluid processing bag including a fluid-agitating element, said processing bag having a flexible body at least partially defining a first interior chamber for receiving and holding the detectable gas in the absence of a leak;
- a sensor associated with the detection chamber and capable of sensing the detectable gas external to the first interior chamber as the result of the leak; and
- a pump for creating a pressure differential between the first interior chamber and the detection chamber.

21. The apparatus of claim 20, further including a valve for controlling the flow of the detectable gas from a source of the detectable gas to the first interior chamber.

22. The apparatus of claim 20, further including a connector for delivering the detectable gas to the first interior chamber under sterile conditions.

23. The apparatus of claim 22, wherein the connector comprises a sterilizing filter.

24. The apparatus of claim 20, further including a rigid container forming the detection chamber for receiving the first container.

25. The apparatus of claim 24, wherein the rigid container includes a port adapted for delivering the detectable gas from a source external to the first interior chamber.

26. The apparatus of claim 24, wherein the rigid container further includes a cover for hermetically sealing the detection chamber.

27. The apparatus of claim 26, wherein the cover includes a port adapted for permitting the delivery of the detectable gas from a source external to the detection chamber.

28. The apparatus of claim 20, further including a spacer for promoting the escape of the detectable gas from any leak in the first container.

29. The apparatus of claim 24, further including a spacer positioned between the sterilized fluid processing bag and a wall of the rigid container.

30. An apparatus for use in detecting a detectable gas in a hermetically sealed detection chamber, comprising:
- a sterilized first container for positioning in the detection chamber, said first container having a flexible body at least partially defining a first interior chamber for receiving and holding the detectable gas in the absence of a leak;
- a sensor associated with the detection chamber and capable of sensing the detectable gas external to the first interior chamber as the result of the leak;
- a pump for creating a pressure differential between the first interior chamber and the detection chamber; and
- a rigid container forming the detection chamber for receiving the first container, said rigid container including a port adapted for delivering the detectable gas from a source external to the first interior chamber.

31. The apparatus of claim 30, further including a valve for controlling the flow of the detectable gas from a source of the detectable gas to the first interior chamber.

32. The apparatus of claim 30, further including a connector for delivering the detectable gas to the first interior chamber.

33. The apparatus of claim 32, wherein the connector comprises a sterilizing filter.

34. The apparatus of claim 30, wherein the rigid container includes a port adapted for delivering the detectable gas from a source external to the first interior chamber.

35. The apparatus of claim 30, wherein the rigid container further includes a cover for hermetically sealing the detection chamber.

36. The apparatus of claim 35, wherein the cover includes a port adapted for permitting the delivery of the detectable gas from a source external to the detection chamber.

37. The apparatus of claim 30, wherein the first container comprises a fluid processing bag including a fluid-agitating element.

38. The apparatus of claim 30, further including a spacer for promoting the escape of the detectable gas from any leak in the first container.

* * * * *